US012572614B2

(12) United States Patent
    Gelli et al.

(10) Patent No.: US 12,572,614 B2
(45) Date of Patent: Mar. 10, 2026

(54) AUTOMATED GENERATION OF PROMPTS FOR RESEARCH SUMMARIES USING GENERATIVE ARTIFICIAL INTELLIGENCE

(71) Applicant: PAYPAL, INC., San Jose, CA (US)

(72) Inventors: Francesco Gelli, Singapore (SG); Yanfei Dong, Singapore (SG); Ting Lin, Singapore (SG); Pingxia Zheng, Singapore (SG); Nithin Navin Mangalore, Jersey City, NJ (US); Sathish Kumar Palaniappan, Chennai (IN); Chenna Rao Eda, Hyderabad (IN); Rushik Navinbhai Upadhyay, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 18/402,884

(22) Filed: Jan. 3, 2024

(65) Prior Publication Data

US 2025/0217427 A1      Jul. 3, 2025

(51) Int. Cl.
    *G06F 16/34*        (2025.01)
    *G06F 16/9538*      (2019.01)
    *G06N 3/0455*       (2023.01)

(52) U.S. Cl.
    CPC ........ *G06F 16/9538* (2019.01); *G06F 16/345* (2019.01); *G06N 3/0455* (2023.01)

(58) Field of Classification Search
    CPC ........................... G06F 16/345; G06F 16/9538
    See application file for complete search history.

(56) References Cited

U.S. PATENT DOCUMENTS

| | | | | |
|---|---|---|---|---|
| 5,634,051 A | * | 5/1997 | Thomson | G06F 16/334 |
| | | | | 707/999.005 |
| 7,571,177 B2 | * | 8/2009 | Damle | G06F 16/367 |
| | | | | 707/999.102 |
| 2007/0118506 A1 | * | 5/2007 | Kao | G06F 16/345 |
| 2007/0118518 A1 | * | 5/2007 | Wu | G06F 16/345 |
| | | | | 707/999.005 |
| 2024/0073160 A1 | * | 2/2024 | Mallin | G06F 40/232 |
| 2025/0005050 A1 | * | 1/2025 | Krishnan | G06F 16/243 |
| 2025/0061291 A1 | * | 2/2025 | Gardner | G06F 40/56 |

* cited by examiner

*Primary Examiner* — Robert W Beausoliel, Jr.
*Assistant Examiner* — Nirav K Khakhar
(74) *Attorney, Agent, or Firm* — Greenberg Traurig, LLP

(57)        ABSTRACT

A method according to the present disclose may include presenting, on a graphical user interface (GUI), an interactive element; receiving, via the interactive element on the GUI, a research target and a type of research; autonomously retrieving, from a search engine, search results related to the research target; identifying, using a predictive machine learning model, at least one relevant portion of the search results, the at least one relevant portion comprising information related to the research target and responsive to the type of research; generating a prompt based on the type of research and the at least one relevant portion of the search results; and receiving, from a generative machine learning model in response to receipt of the generated prompt, a report indicative of the research target.

20 Claims, 6 Drawing Sheets

310 — Receive Indication of Query

320 — Determining, by First ML Model, Set of Search Results Responsive to Query

330 — Generating, by Second ML Model, Prompt Configured to Trigger Summary Responsive to Query 340 — Transmitting Second Prompt and Set of Search Results to Generative AI Program

300

350 — Presenting, on GUI, Summary Responsive to Query

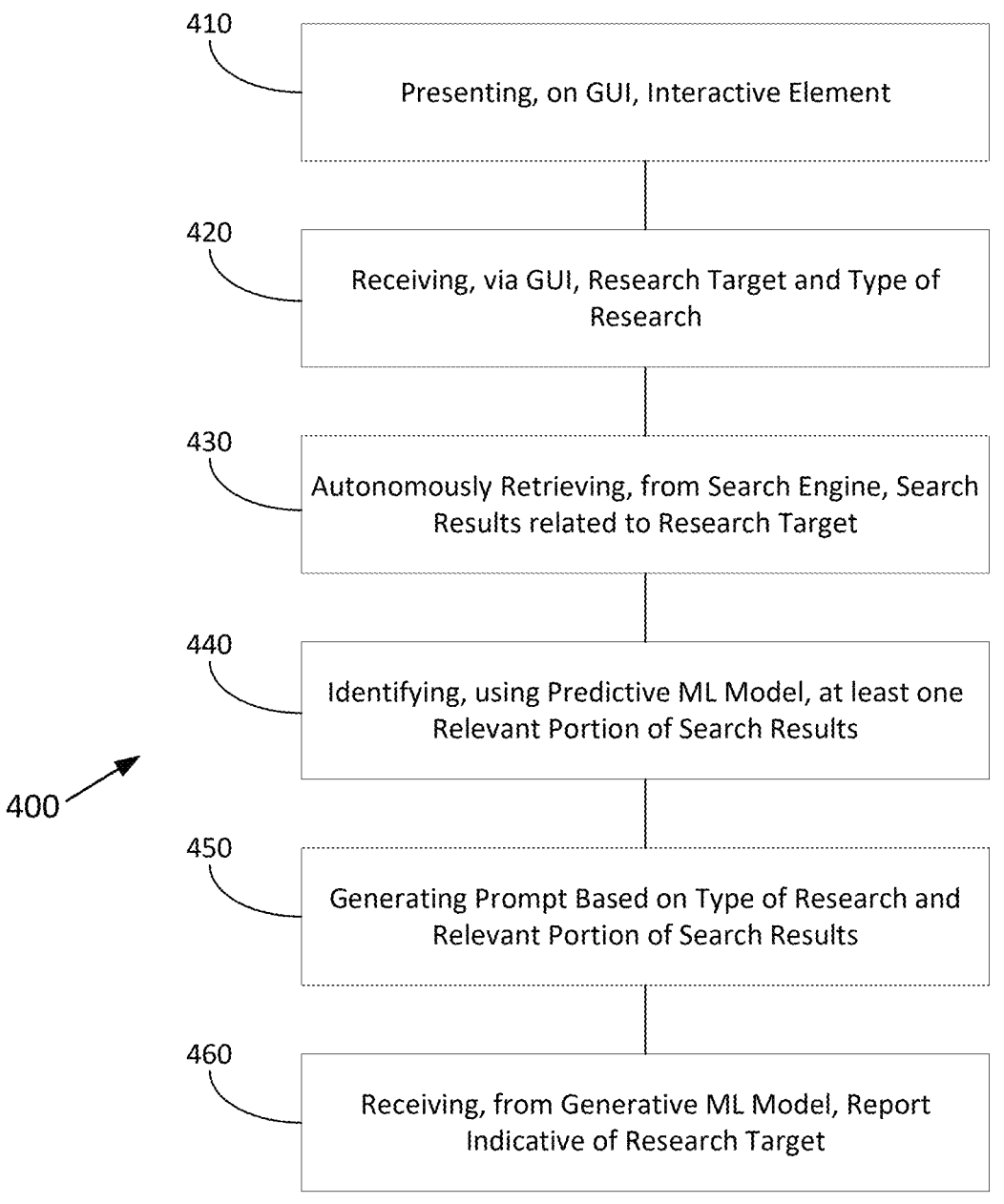

410   Presenting, on GUI, Interactive Element

420   Receiving, via GUI, Research Target and Type of Research

430   Autonomously Retrieving, from Search Engine, Search Results related to Research Target 440   Identifying, using Predictive ML Model, at least one Relevant Portion of Search Results

400

450   Generating Prompt Based on Type of Research and Relevant Portion of Search Results 460   Receiving, from Generative ML Model, Report Indicative of Research Target

*FIG. 4*

510    Generating, on GUI, Interactive Element

520    Receiving Research Target and Research Category

530    Retrieving Set of Documents Related to Research Target

500

540    Generating Prompt for Generative AI Model

550    Presenting, on GUI, Research Summary from Generative AI Model

AUTOMATED GENERATION OF PROMPTS FOR RESEARCH SUMMARIES USING GENERATIVE ARTIFICIAL INTELLIGENCE

TECHNICAL FIELD

The instant disclosure relates to utilizing artificial intelligence (AI) to conduct and summarize research topics.

BACKGROUND

Background checks are a common pre-requisite to many opportunities, including employment or volunteer work. While there are groups that perform formal background checks based on otherwise confidential information, many background checks are a synthesis of web searches that probe for publicly-available information through targeted and keyword searching. These informal searches are effective at gathering information, particularly when the desired background check is less for clearing the target of the check and more for understanding the target of the check-whether it be for an individual or an organization.

BRIEF DESCRIPTION OF THE DRAWINGS

FIG. 4 is a flow chart illustrating an example method of generating research summary reports using artificial intelligence.

DETAILED DESCRIPTION

Figure 1:
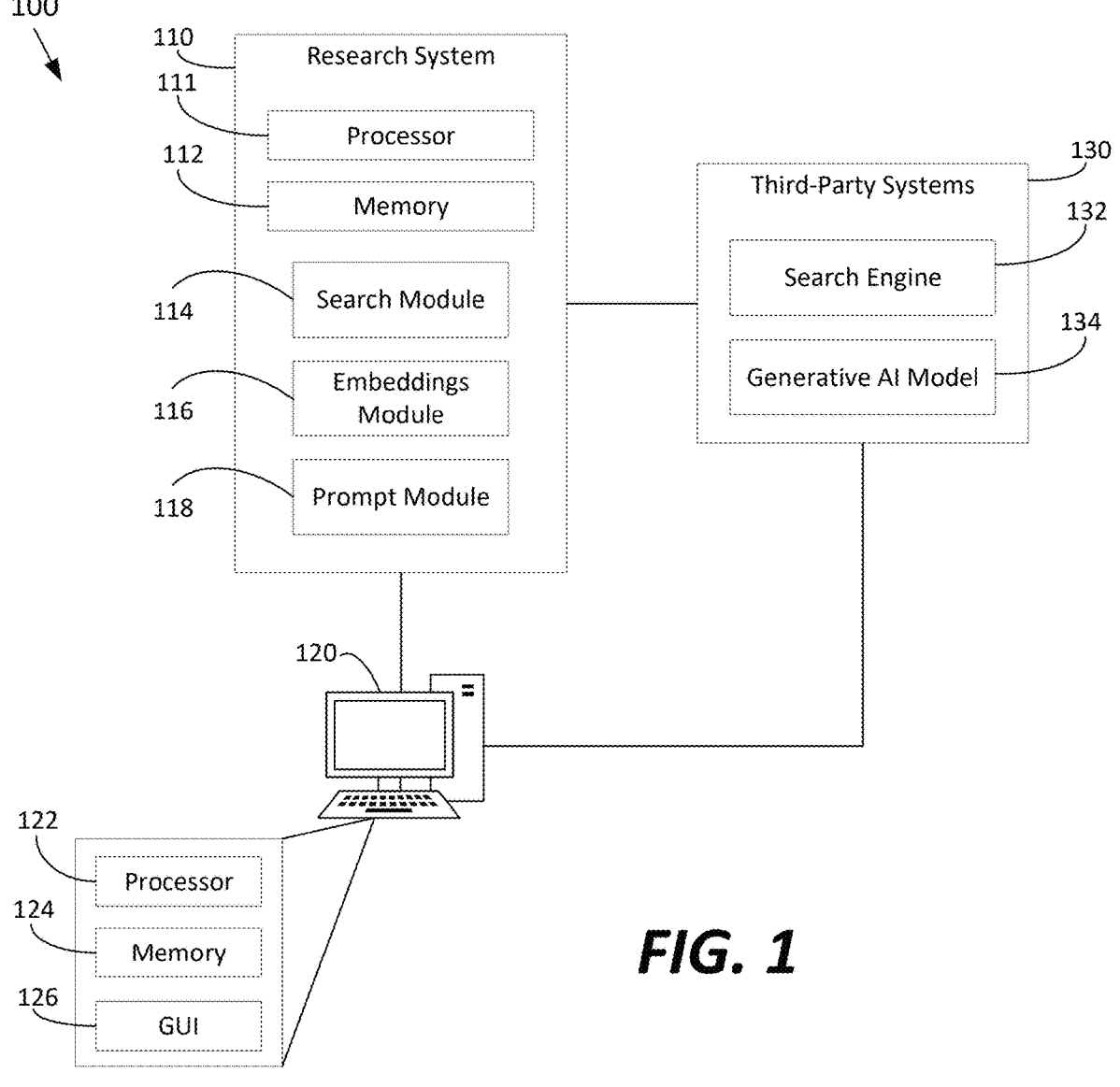
FIG. 1 is a block diagram of an example system for generating research summary reports using artificial intelligence.

Artificial Intelligence (AI) models include two prominent categories: predictive AI and generative AI. Predictive AI models perform interpolation (e.g., creating new datapoints within a range of known data points) in order to predict, estimate, or guess at a future value based on an input. These models are typically trained using pairs of inputs and outputs, from which the predictive AI model may extract (or derive) cause-and-effect relationships between the inputs and outputs in order to predict an unknown output for a known input. Through proper training, predictive AI models can exhibit a remarkable degree of accuracy, and are adept at analysis and other data-crunching tasks that may take the human mind significantly longer.

Generative AI models, on the other hand, perform extrapolation (e.g., creating new datapoints outside of a range of known data points) in order to produce, generate, or synthesize ostensibly "new" content in response to a prompt. These models are trained using examples or samples from the medium into which the model will synthesize content—for example, models that are intended to generate text are trained using example texts, while models that are intended to generate images are trained using example images. While content from generative AI models may appear to be new (e.g., never-before-seen), these models do not create new content but instead (essentially) consult their training data and attempt to respond to the prompt by mimicking the style of the training data.

Because generative AI models are capable of generating content at astounding rates, they can provide wide-ranging utility. One such use may be found in summarizing research results, for which a user may supply a set of search results to a generative AI model and the model may return a summary. However, effective use of generative AI models can be limited by a user's ability to create effective prompts. As described above, the output of a generative AI model is entirely responsive to the input prompt. If the input prompt is poorly-worded, unclear, or misdirected, the generated output will be negatively-impacted. If the input prompt is different for multiple users in the same searching organization, the results of the searches will not be consistent across the searching organization. For research summaries, if the search results are not appropriately filtered, if the target of the research is not properly identified, or if the purpose of the research is not specified, any resultant summary is likely to miss the mark.

Accordingly, there is a need for a system that automatically generates prompts for generative AI models in order to ensure consistent and quality research summaries. A system according to the disclosure herein satisfies such a need by receiving search criteria from a user, retrieving and extracting relevant search results, and synthesizing the results—with any specific criteria—into a prompt for a generative AI model. By autonomously performing each step of the process, this system may reduce the time required to generate each summary, in addition to improving the consistency of the summaries. Furthermore, because the system utilizes a predictive AI model to review search results, the research summaries created as a product of this system may be more accurate than their human-created counterparts, as the predictive AI model here may ignore noise inherent in search results.

Referring to the drawings, wherein like reference numerals refer to the same or similar features in the various views, FIG. 1 is a block diagram of an example system 100 for generating a prompt for a generative AI model based on criteria received from a user. As shown, the system 100 may include a research system 110, a user device 120, and third-party systems 130, each of which may be in electronic communication with one another and/or with other components via a network. The network may include any suitable connection (or combinations of connections) for transmitting data to and from each of the components of the system, and may include one or more communication protocols that dictate and control the exchange of data.

As shown, the research system 110 may include one or more functional modules 114, 116, 118 embodied in hardware and/or software. In an embodiment, the functional modules 114, 116, 118 of the research system 110 may be embodied in a processor 111 and a memory 112 (i.e., a non-transitory, computer-readable medium) storing instructions that, when executed by the processor 111, cause the research system 110 to perform the functionality of one or more of the functional modules 114, 116, 118 and/or other functionality of this disclosure. For example, the research system 110 may receive search criteria from a user (e.g., via user device 120), retrieve and process search results (e.g., from third-party systems 130), and generate a prompt to send to a generative AI model.

The user device 120 may include a processor 122 and a memory 124, which may be any suitable processor and memory. In particular, the user device 120 may be a computing device (e.g., desktops, tablets, laptops, etc.). The memory 124 may store instructions that, when executed by the processor 122, cause a graphical user interface (GUI) 126 to display on the user device 120. This GUI 126 may be provided, in part, by the research system 110 and, particularly, one of the functional modules 114, 116, 118 of the research system 110. The GUI 126 may enable the receipt of one or more search criteria, as well as display the resultant research summary.

The third-party system 130 may include a search engine 132 and a generative AI model 134. The search engine 132 may be any applicable or useful search engine configured to receive a search term(s) and generate a list of results in response. In some embodiments, the search engine 132 may be a general use search engine that provides results from across the web (e.g., Google®, Bing®, etc.). In some embodiments, the search engine 132 may be a specialized search engine that provides results within a subset of the web, such as a search engine specifically restricted to retrieving criminal records, or a search engine limited to written publications or newspaper archives. The generative AI model 134 may be any pre-trained model capable of generating content in response to a prompt, such as a large language model (LLM). In particular, the generative AI model 134 may be a publicly-available model, such as dolly, MPT, Falcon, or a proprietary model, such as Dall-E™, ChatGPT™, or Google Bard®. The generative AI model 134 may further be an internal model that is kept private and used specifically for these purposes.

The functional modules 114, 116, 118 may include a search module 114 configured to generate a prompt for the search engine 132 based on received criteria and to retrieve results from the search engine 132. In some embodiments, the search module 114 may receive criteria from the user by displaying one or more options on the GUI 126. The options may include a selectable list of search criteria, and may include fields configured to receive text. For example, the selectable list may include countries relevant to the search, a tone of the search (e.g., general search, a search for negative actions, a search for positive actions, etc.), a scope of the search (e.g., exact matches only, broad matches allowed), or a breadth of search (e.g., how many pages of search results to retrieve). The text fields may include a name of the research subject (e.g., individual name, organizational name, etc.) and any biographical data (e.g., employment, date of birth, address, corporate headquarters, etc.) that may be used to narrow results.

The search module 114 may generate the prompt based on the received criteria, in some embodiments, by retrieving one or more search terms associated with each received criterion. For example, in response to the user selecting "negative actions" for the search tone, the search module 114 may populate the prompt with terms associated with negative actions (e.g., arrest, launder, scandal, bribe, etc.). The retrieved terms may be further narrowed by other criteria, such that the retrieved terms may be those terms that satisfy multiple criteria. For the example in which the search tone is "negative" and the target of the research is an organization (rather than an individual), the populated terms may include terms more associated with negative corporate activity (e.g., bankrupt, bailout, out of business, into administration, etc.) as opposed to terms more associated with negative individual activity (e.g., terror, smuggling, drugs, hawala, etc.) In some embodiments, the search module 114 may generate the prompt using the text entered into the fields, and may add search qualifiers where relevant or possible (e.g., "country (United States)" in response to the user indicating the United States as the country of interest).

The functional modules 114, 116, 118 may include a embeddings module 116 configured to generate embeddings vectors for the search results retrieved by the search module 114 and to determine one or more relevant (e.g., responsive) results based on the embeddings vectors. Relevant results may include (a) any document that mentions the research target, (b) any document that substantively discusses the research target, and (c) any document that substantively discusses the research target with the requested tone, for different embodiments. To generate the embeddings vectors, the embeddings module 116 may utilize a trained generator model that receives, as input, a document (e.g., web page, article, blog post, etc.) from the search results and produces, as output, a vector representative of the content of the document within the embeddings space.

In some embodiments, the embeddings module 116 may process the search results prior to generating embeddings vectors. This processing may include removing noise from the result documents (e.g., ads, filler text, etc.), and may include dividing the documents into chunks or portions. By dividing the documents into smaller portions, the embeddings module 116 may generate embeddings that better capture the differences in content from one portion (e.g., sentence, paragraph, etc.) at the cost of increased processing. For example, if a document from the search results is a list of notable businesspeople indicted for bribery and the research target is only one person on the list, an embeddings vector generated for the entire document may indicate that the document is irrelevant, while an embeddings vector generated for the portion of the document that discusses the research target would indicate that the document is relevant.

The embeddings module 116 may divide each document based on a pre-set length (e.g., each document chunk contains 100 characters of text) or based on a content of the document (e.g., each document chunk contains a complete sentence/paragraph). For example, the embeddings module 116 may employ an LLM to identify sentences based on parts of speech, or may employ a more basic text analysis model to identify white space indicative of the space between paragraphs.

In order to determine relevancy of each document or document chunk, the embeddings module 116 may generate an embeddings vector representative of the research target to serve as a reference vector. The embeddings module 116 may calculate a distance from the reference vector to each document embeddings vector, and may determine those document embeddings vectors within a threshold distance as "relevant." This threshold distance may be pre-determined for the research system 110, or may be dynamic based on the received criteria. For example, if the user indicated that they are looking for a "broad match" on the research, the threshold distance may be greater than if the user indicated "exact match" (meaning that more document embeddings vectors may be indicated as relevant).

In some embodiments, the embeddings module 116 may determine relevant results by utilizing a vectorstore. The vectorstore may be any suitable vector database configured to facilitate comparison and analysis within the entire set of generated embeddings vectors. In particular, the vectorstore may "plot" each vector stored within the vectorstore, such that similar vectors (e.g., representing similar documents) are clustered together. This may enable a user (e.g., the embeddings module 116) to quickly identify those data (e.g., documents) that are relevant to a reference datapoint (e.g., research target) by determining the cluster(s) of vectors close to the reference datapoint within the vectorstore. This may also enable a maximum marginal relevance (MMR) search, which is a method of searching that prioritizes not only similarity to the initial query but also diversity within the set of results.

In this way, the vectorstore may also serve as a memory-extension for the trained generator model by cataloging each embeddings vector generated, so that the trained generator model does not need to re-generate embeddings vectors each time the embeddings module 116 determines a distance. The vectorstore may also be used by the embeddings module 116 to remove noise from the search results. For example, embeddings vectors that include noise (e.g., advertisements, filler text) are likely to be isolated within the vectorstore, as such vectors would bear very little in common with the other embeddings vectors. Accordingly, the embeddings module 116 may remove any embeddings vectors that are isolated from the rest as representative of noise.

The functional modules 114, 116, 118 may include a prompt module 118 configured to generate a prompt for the generative AI model 134 based on the received search criteria and on the relevant search results identified by the embeddings module 116. For each of the received search criteria, the prompt module 118 may retrieve a corresponding term or phrase from storage (e.g., memory 112) and may generate the prompt as a combination of those retrieved terms and phrases. In some embodiments, the prompt module 118 may retrieve a pre-generated prompt from storage based on a single received criterion (e.g., the tone of the search is negative), and may populate portions of the pre-generated prompt based on other received criteria and/or the relevant search results. In other embodiments, the prompt module 118 may utilize a machine learning (ML) model trained to generate prompts based on a type (e.g., tone) of research that may then be populated by the relevant search results. In some embodiments, the relevant search results may be included in the prompt as the text of the document chunks or portions identified as relevant by the embeddings module 116. In other embodiments, the relevant search results may be included in the prompt as vectorized datapoints (e.g., as the generated embeddings vectors representative of relevant document chunks).

Figure 2:
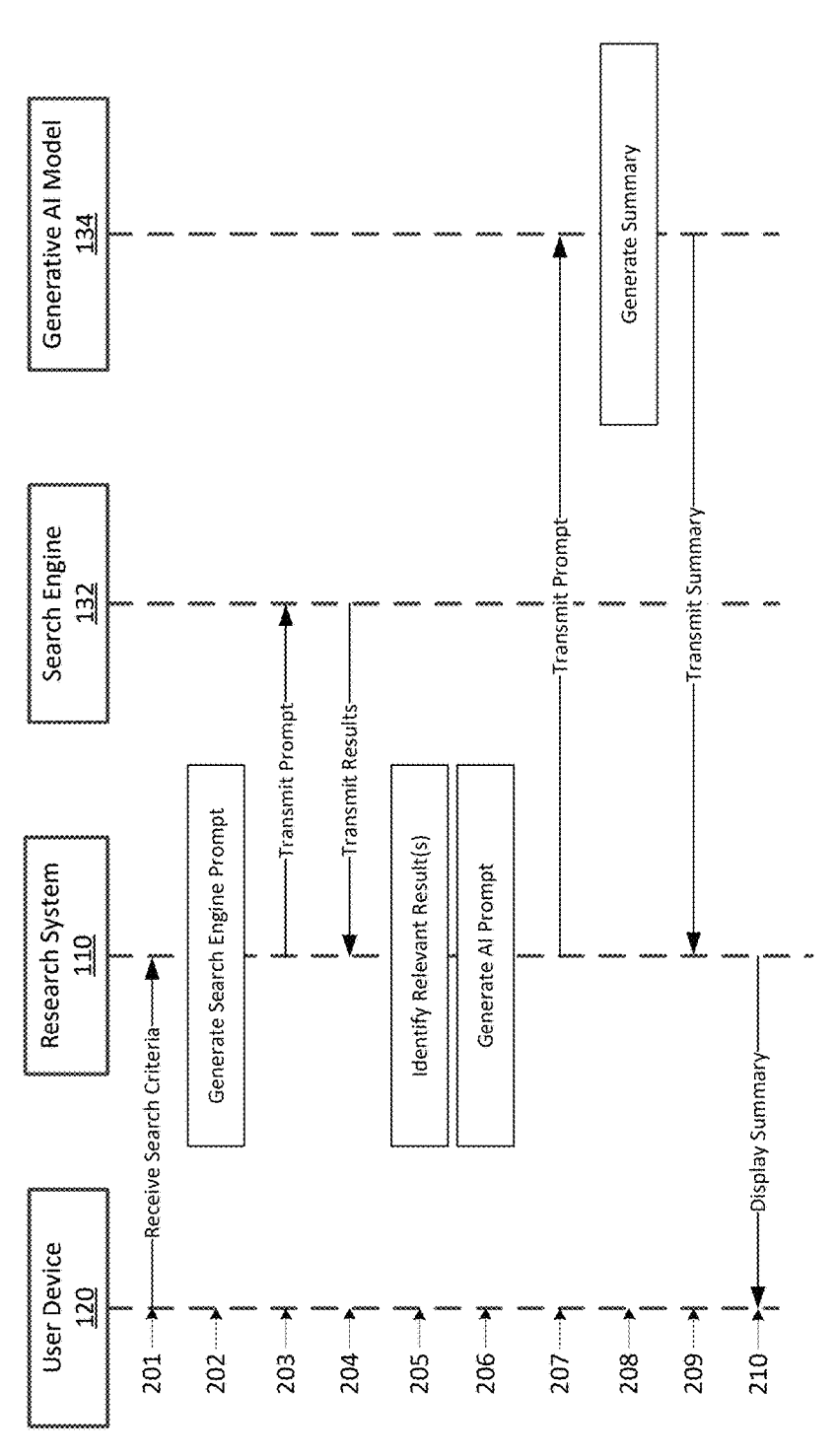
FIG. 2 is a process chart illustrating an example process of generating research summary reports using artificial intelligence.

FIG. 2 is a process chart illustrating an example process 200 of generating research summary reports using artificial intelligence. The process 200, or one or more portions of the process 200, may be performed by the research system 110 (shown in FIG. 1) and, in particular, the search module 114 (for retrieving search results), embeddings module 116 (for determining relevant search results), and the prompt module 118 (for generating the generative AI prompt), in some embodiments.

The process 200 may begin at step 201 with the research system 110 receiving search criteria from the user device 120. These criteria may include a research target and a research type, and may be received via one or more interactive elements generated on the GUI 126 of the user device 120 by the search module 114. As described above, the interactive elements may include a list with selectable options or a field configured to receive text inputs for open-ended responses.

At step 202, the research system 110 may generate a first prompt for the search engine 132 based on the received criteria. This first prompt may be configured to cause the search engine 132 to return results responsive to the received search criteria. In some embodiments, the search module 114 may generate the prompt by retrieving a pre-determined prompt (or template) from storage (e.g., memory 112) based on at least one of the search criteria. From there, the search module 114 may populate the pre-determined prompt based on the remaining search criteria. For example, the template may be "{NAME} {EMPLOYMENT} {LOCATION} {DOB} AND {SEARCH_TERMS}," and the search module 114 may insert information from the received criteria into each field. At step 203, the research system 110 transmits the prompt to the search engine 132, and receives results in return at step 204.

At step 205, the research system 110 (e.g., the embeddings module 116) identifies at least one relevant result from the results received at step 204. As described above, the embeddings module 116 may determine which of the results may be considered relevant (e.g., responsive to the received criteria) by generating embeddings vectors representative of each document (or each document chunk, if the documents are first divided), and by determining a distance between the generated embeddings vectors and a reference vector representative of the received criteria. In some embodiments, the embeddings module 116 may utilize a vectorstore populated by generated embeddings vectors.

At step 206 the research system 110 (e.g., prompt module 118) may generate a second prompt for the generative AI model 134. This second prompt may be configured to cause the generative AI model 134 to synthesize relevant search results into a summary responsive to the received search criteria from step 201. As described above, the prompt module 118 may retrieve a pre-determined prompt (or template) from storage (e.g., memory 112) based on at least one of the search criteria (e.g., the tone of the research), and may populate the pre-determined prompt based on the other received criteria and the results identified as relevant at step 205. The pre-determined prompt may include one or more conditions or limitations that serve to standardize the results from the generative AI model 134 in order to ensure a level of consistency. For example, the pre-determined prompt may state that the generative AI model 134 is to "Include a single Sources section at the very end of the report, with a list of the unique URLs," as well as particular rules for how to format this section. The pre-determined prompt may also include an instruction to respond with "No relevant news was found for the searched input" if there are no relevant results identified.

From there, the research system 110 may transmit the second prompt to the generative AI model at step 207, and the generative AI model 134 may generate the summary at step 208 and transmit the summary back to the research system 110. At step 210, the research system 110 may format and display the summary on the user device 120. In particular, the research system 110 may generate an element on the GUI that includes the text of the summary, as well as an option or interface to make edits and otherwise provide feedback. In some embodiments, the research system 110 may utilize any feedback received in this manner to adjust and refine the research system 110, including the trained generator of the embeddings module 116.

Figure 3:
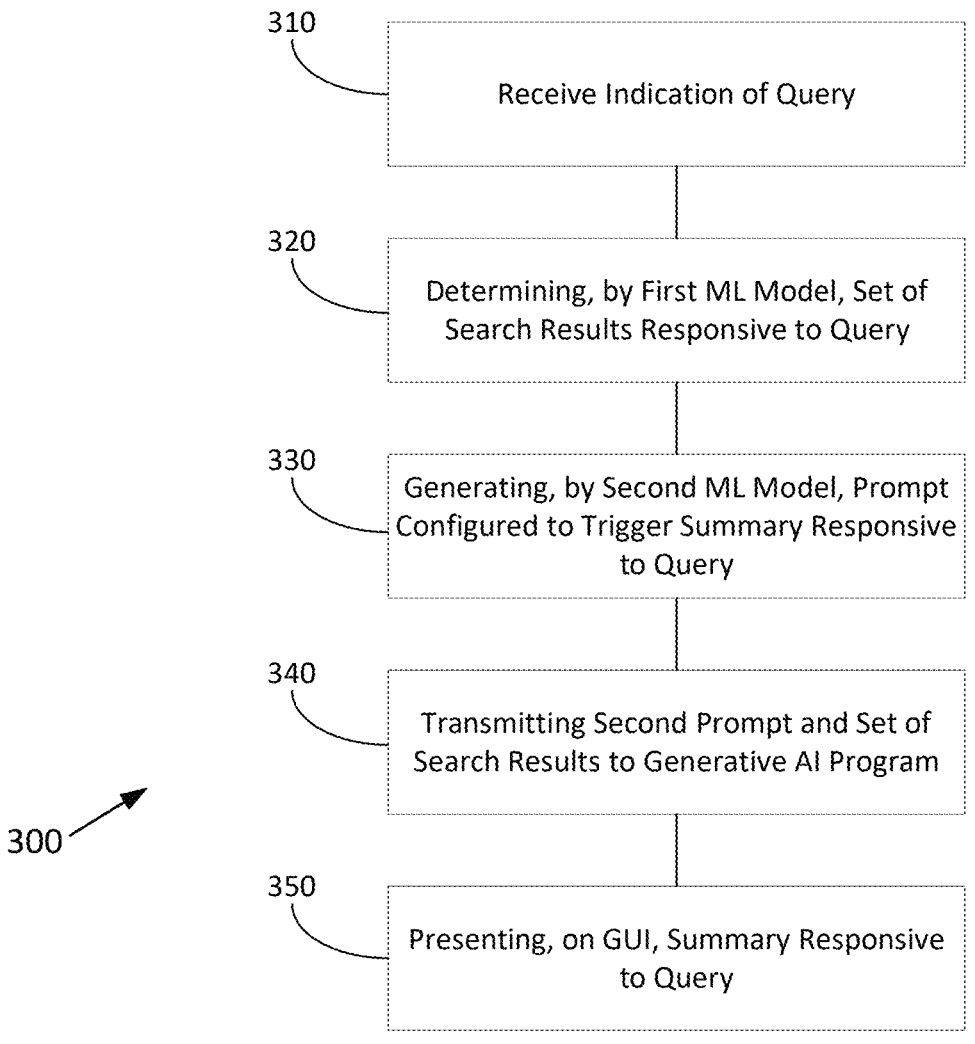
FIG. 3 is a flow chart illustrating an example method of generating research summary reports using artificial intelligence.

FIG. 3 is a flow chart illustrating an example method 300 of generating research summary reports using artificial intelligence. The method 300, or one or more portions of the method 300, may be performed by the research system 110 (shown in FIG. 1) and, in particular, one or more of the functional modules 114, 116, 118.

The method 300 may include, at block 310, receiving indication of a query from a user. The indication may be received from user device 120 and may be generated (e.g., populated, synthesized, etc.) using the GUI 126 facilitated by the user device 120. In addition to specifying a target for the query, the indication may also include a type of the query (e.g., "negative") and other possibly relevant criteria or biographical data to guide the search. In some embodiments, the GUI 126 may include a list of possible query types, and the indicated type of query may be selected from the list.

The method 300 may include, at block 320, determining a set of research results responsive to the query using a first machine learning model. These research results may be retrieved from search engine 132 in response to a search prompt generated by the search module 114. This first machine learning model may be the trained embeddings generator described above with reference to the embeddings module 116, and the model may determine which research result(s) is responsive based on a relative distance between embeddings representative of the research results and an embeddings vector representative of the query.

The method 300 may include, at block 330, generating a prompt for a generative AI model that is configured to trigger a summary responsive to the query from block 310. As described above with reference to the prompt module 118, the generated prompt may be based on a pre-determined prompt or template that is retrieved in response to the indicated research type. The prompt may then be populated based on other information from the query, as well as responsive research results from block 320.

The method 300 may include, at block 340, transmitting the prompt generated at block 330 to the generative AI program and, at block 350, presenting, on GUI 126, the summary synthesized by the generative AI model 134 and that is responsive to the query. The summary may be presented as text with one or more interactive elements that enable the user to edit the summary and/or provide feedback on the summary.

FIG. 4 is a flow chart illustrating an example method 400 of generating research summary reports using artificial intelligence. The method 400, or one or more portions of the method 300, may be performed by the research system 110 (shown in FIG. 1) and, in particular, one or more of the functional modules 114, 116, 118.

The method 400 may include, at block 410, presenting an interactive element on GUI 126, and, at block 420, receiving a research target and a type of research via the presented interactive element. The interactive element may include at least one of a list of pre-determined items or a box configured to receive text, with the user able to indicate the research target and the type of research using either the list or the text box. For example, the list of pre-determined items may include a list of possible research types.

The method 400 may include, at block 430, autonomously retrieving, from search engine 132, search results related to the research target. First, the research system 110 may generate a search prompt to send to the search engine 132 that is configured to trigger the search engine 132 to return a set of documents (e.g., webpages) that are responsive to the research target. The research system 110 may generate this prompt by retrieving a pre-determined prompt or phrase, and by populating the prompt or phrase with additional information received via the GUI 126.

The method 400 may include, at block 440, identifying at least one relevant portion of the search results using a predictive ML model. This predictive ML model may be the trained generator described above with reference to the embeddings module 116, and may be utilized to generate embeddings representative of each search result (or of each portion of each search result, if the search results are first chunked). From there, the relevant portions of the search results may be identified as those portions having embeddings vectors within a threshold distance of a reference vector (e.g., an embeddings vector representative of the research target).

The method 400 may include, at block 450, generating a prompt for a generative ML model (e.g., generative AI model 134) based on the type of research and the set of relevant results. As described above with reference to the prompt module 118, the generated prompt may begin as a pre-determined prompt retrieved based on the type of research. From there, the pre-determined prompt may be populated with other information (e.g., the set of relevant results, biographical details of the research target, etc.) before being sent to the generative ML model. At block 460, a report may be received from the generative ML model that is indicative of the research target from block 410.

Figure 5:
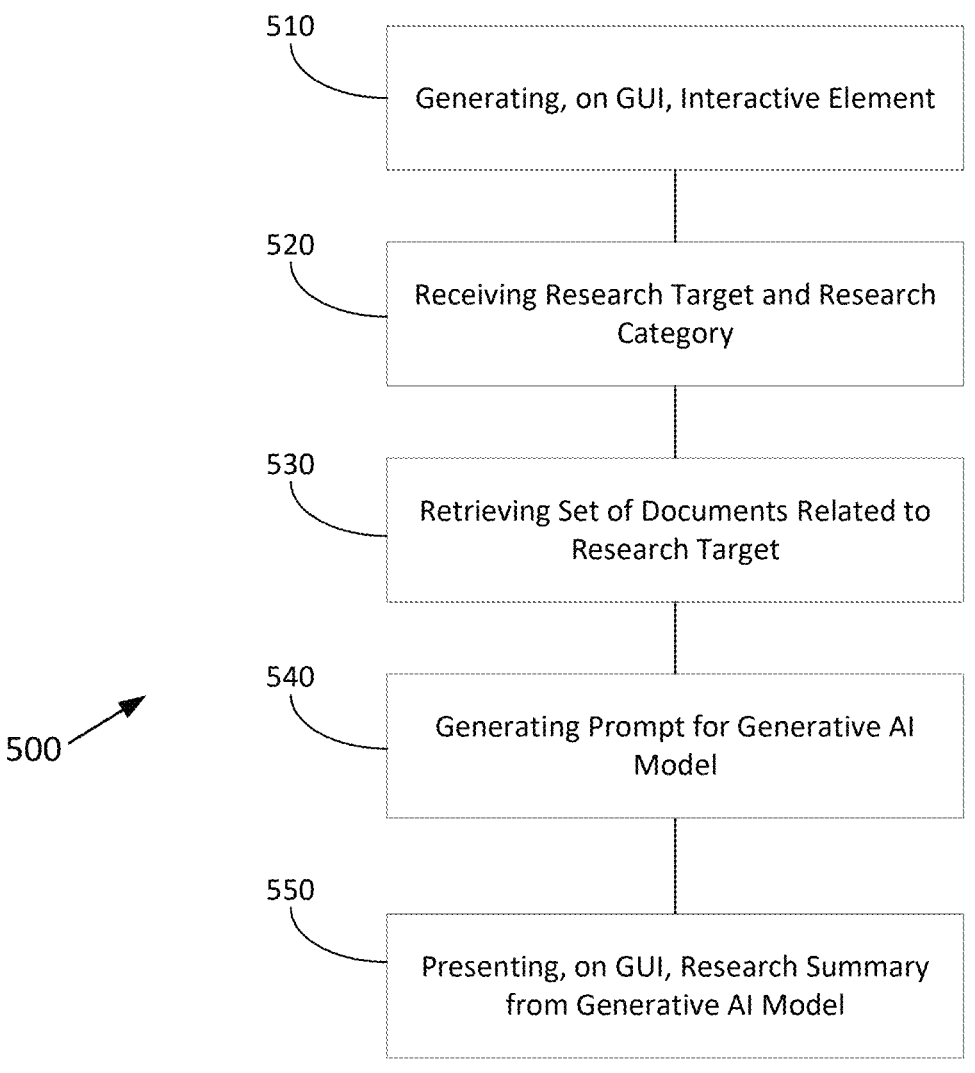
FIG. 5 is a flow chart illustrating an example method of generating research summary reports using artificial intelligence.

FIG. 5 is a flow chart illustrating an example method 500 of generating research summary reports using artificial intelligence. The method 500, or one or more portions of the method 300, may be performed by the research system 110 (shown in FIG. 1) and, in particular, one or more of the functional modules 114, 116, 118.

The method 500 may include, at block 510, generating an interactive element on GUI 126 of the user device 120 and, at block 520, receiving a research target and a research category via the interactive element. The interactive element may enable a user of the user device 120 to provide one or more criteria for a research task. In some embodiments, the interactive element may include multiple interactive elements that are each configured to receive a different criterion for the research. For example, one interactive element may be a text box into which the user may enter the research target, and another interactive element may be a list of research categories from which the user may choose.

The method 500 may include, at block 530, retrieving a set of documents related to the research target. These documents may be retrieved from search engine 132 in response to a prompt transmitted based on the criteria received at block 520, and the documents may include web pages, blog posts, official government papers, records, or any other text-based content available on the internet.

The method 500 may include, at block 540, generating a prompt for the generative AI model 134. The prompt may be generated based on the criteria received at block 520, as well as on some (or all) of the documents retrieved at block 530. For example, the prompt may be a pre-generated prompt retrieved from memory based on the indicated research category that is supplemented by information from the documents. In some embodiments, the information from the documents may be vectorized before inclusion in the prompt.

The method 500 may include, at block 550, presenting a research summary from the generative AI model 134 on the GUI 126. The presentation may include text from the research summary, as well as one or more interactive elements that may enable a user to edit the text and provide feedback on the research summary. The research system 110 may utilize this feedback to adjust one or more of the models utilized by the research system 110.

Figure 6:
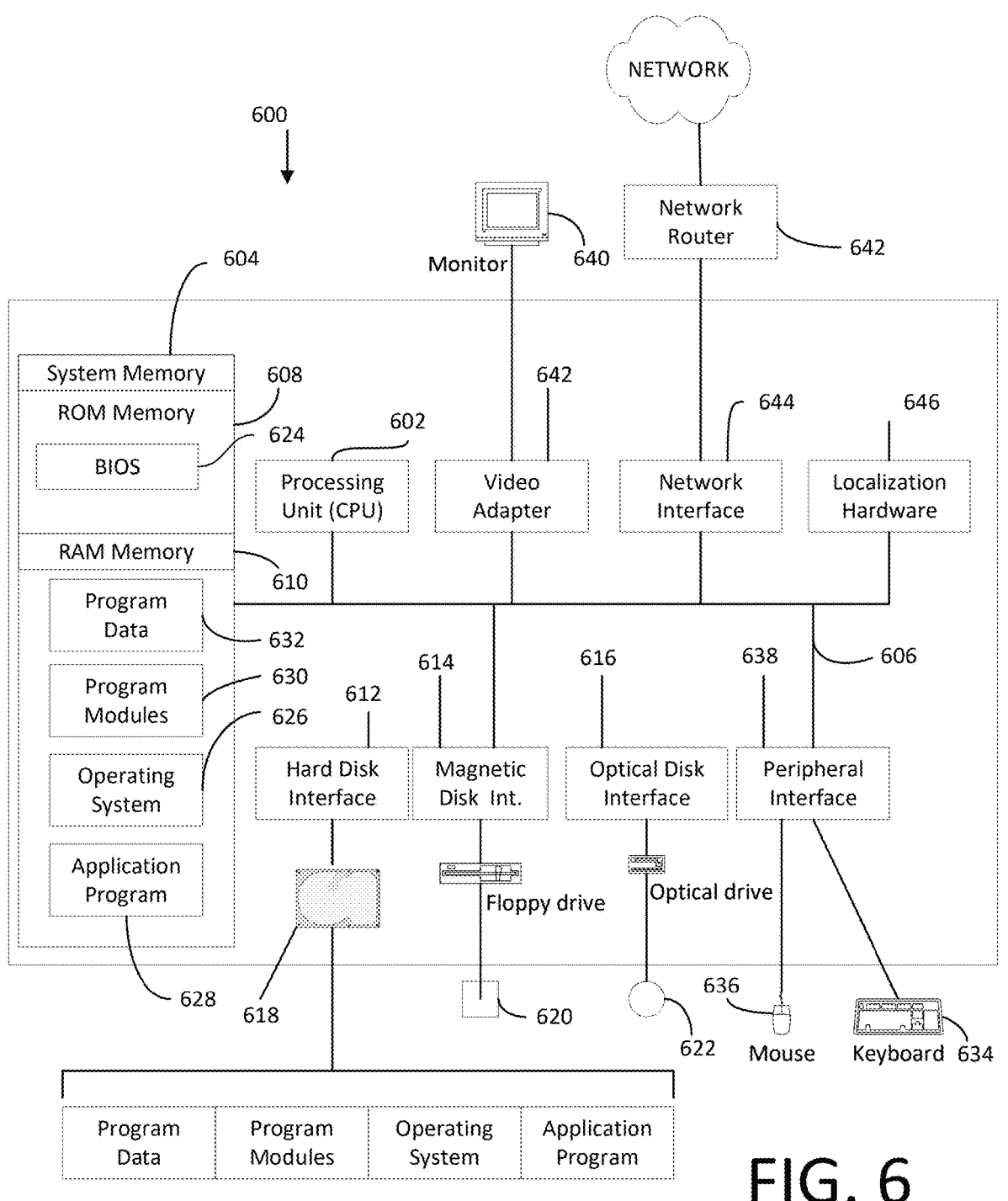
FIG. 6 is a diagrammatic view of an example embodiment of a user computing environment.

FIG. 6 is a diagrammatic view of an example embodiment of a user computing environment that includes a computing system environment 600, such as a desktop computer, laptop, smartphone, tablet, or any other such device having the ability to execute instructions, such as those stored within a non-transient, computer-readable medium. For example, the computing system environment 600 may be the user device 120 or a system hosting the research system 110. In another example, one or more components of the computing system environment 600, such as one or more CPUs 602, RAM memory 610, network interface 644, and one or more hard disks 618 or other storage devices, such as SSD or other FLASH storage, may be included in the research system 110. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 600 typically includes at least one processing unit 602 (e.g., processor 111) and at least one memory 604 (e.g., memory 112), which may be linked via a bus. Depending on the exact configuration and type of computing system environment, memory 604 may be volatile (such as RAM 610), non-volatile (such as ROM 608, flash memory, etc.) or some combination of the two. Computing system environment 600 may have additional features and/or functionality. For example, computing system environment 600 may also include additional storage (removable and/or non-removable) including, but not limited to, magnetic or optical disks, tape drives and/or flash drives. Such additional memory devices may be made accessible to the computing system environment 600 by means of, for example, a hard disk drive interface 612, a magnetic disk drive interface 614, and/or an optical disk drive interface 616. As will be understood, these devices, which would be linked to the system bus, respectively, allow for reading from and writing to a hard disk 618, reading from or writing to a removable magnetic disk 620, and/or for reading from or writing to a removable optical disk 622, such as a CD/DVD ROM or other optical media. The drive interfaces and their associated computer-readable media allow for the nonvolatile storage of computer readable instructions, data structures, program modules and other data for the computing system environment 600. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 600.

A number of program modules may be stored in one or more of the memory/media devices. For example, a basic input/output system (BIOS) 624, containing the basic routines that help to transfer information between elements within the computing system environment 600, such as during start-up, may be stored in ROM 608. Similarly, RAM 610, hard disk 618, and/or peripheral memory devices may be used to store computer executable instructions comprising an operating system 626, one or more applications programs 628 (which may include the functionality of the research system 110 of FIG. 1 or one or more of its functional modules 114, 116, 118, for example), other program modules 630, and/or program data 632. Still further, computer-executable instructions may be downloaded to the computing environment 600 as needed, for example, via a network connection.

An end-user may enter commands and information into the computing system environment 600 through input devices such as a keyboard 634 and/or a pointing device 636. While not illustrated, other input devices may include a microphone, a joystick, a game pad, a scanner, etc. These and other input devices would typically be connected to the processing unit 602 by means of a peripheral interface 638 which, in turn, would be coupled to bus. Input devices may be directly or indirectly connected to processor 602 via interfaces such as, for example, a parallel port, game port, firewire, or a universal serial bus (USB). To view information from the computing system environment 600, a monitor 640 or other type of display device may also be connected to bus via an interface, such as via video adapter 642. In addition to the monitor 640, the computing system environment 600 may also include other peripheral output devices, not shown, such as speakers and printers.

The computing system environment 600 may also utilize logical connections to one or more computing system environments. Communications between the computing system environment 600 and the remote computing system environment may be exchanged via a further processing device, such a network router 642, that is responsible for network routing. Communications with the network router 642 may be performed via a network interface component 644. Thus, within such a networked environment, e.g., the Internet, World Wide Web, LAN, or other like type of wired or wireless network, it will be appreciated that program modules depicted relative to the computing system environment 600, or portions thereof, may be stored in the memory storage device(s) of the computing system environment 600.

The computing system environment 600 may also include localization hardware 646 for determining a location of the computing system environment 600. In embodiments, the localization hardware 646 may include, for example only, a GPS antenna, an RFID chip or reader, a WiFi antenna, or other computing hardware that may be used to capture or transmit signals that may be used to determine the location of the computing system environment 600.

In some embodiments, a system may include a processor, and a non-transitory computer readable medium stored thereon instructions that are executable by the processor to cause the system to perform operations that may include receiving an indication of a query, the indication that may include a target of the query and a type of the query, determining, by a first machine learning model and based on the target of the query, a set of search results responsive to the query, generating, by a second machine learning model and based on the type of the query, a prompt configured to trigger, in response to receipt by a generative artificial intelligence (AI) program, a summary responsive to the query, transmitting the second prompt and the set of search results to the generative AI program, and presenting, on a graphical user interface (GUI), the summary responsive to the query.

In some of these embodiments, receiving the indication of the query may include presenting, on the GUI, a list of possible query types, presenting, on the GUI, an interactive element configured to enable text input, receiving, via the GUI, an interaction with at least one of the list or the interactive element, and determining the indication of the query based on the received interactions.

In some of these embodiments, determining the set of search results may include retrieving, from a search engine, a plurality of search results, dividing each search result into a corresponding set of text chunks, generating, via the first machine learning model, a set of embeddings vectors representative of the set of text chunks, generating, via the first machine learning model, a query embeddings vector representative of the target of the query, and determining the set of search results as one or more text chunks corresponding to one or more embeddings vectors within a threshold distance of the query embeddings vector.

In some of these embodiments, the retrieving the plurality of search results from the search engine may include retrieving, from a database, a pre-generated search phrase based on the type of the query, supplementing the pre-generated search phrase with the target of the query, and transmitting the supplemented search phrase to the search engine.

In some of these embodiments, the generated set of embeddings vectors are stored in a vectorstore.

In some of these embodiments, the generating the prompt may include retrieving, from a database, at least one pre-determined phrase, and supplementing the at least one pre-determined phrase with information derived from the indication of the query.

In some of these embodiments, the set of search results is vectorized prior to transmission to the generative AI program.

In some embodiments, a method may include presenting, on a graphical user interface (GUI), an interactive element, receiving, via the interactive element on the GUI, a research target and a type of research, autonomously retrieving, from a search engine, search results related to the research target, identifying, using a predictive machine learning model, at least one relevant portion of the search results, the at least one relevant portion that may include information related to the research target and responsive to the type of research, generating a prompt based on the type of research and the at least one relevant portion of the search results, and receiving, from a generative machine learning model in response to receipt of the generated prompt, a report indicative of the research target.

In some of these embodiments, the identifying the at least one relevant portion of the search results may include dividing the retrieved search results into a plurality of text portions, processing the plurality of text portions to remove noise, generating, for the plurality of text portions, a plurality of embeddings vectors, each embeddings vector representative of a text portion, generating a reference embeddings vector based on the research target, and determining one or more of the plurality of text portions as the at least one relevant portion based on a distance between corresponding embeddings vectors and the reference embeddings vector.

In some of these embodiments, the identifying further may include storing the plurality of embeddings vectors in a vectorstore for training the predictive machine learning model.

In some of these embodiments, the interactive element may include a list of possible research types and a field configured to enable text input.

In some of these embodiments, generating the prompt may include retrieving a pre-determined prompt based on the type of research, and supplementing the pre-determined prompt with the at least one relevant portion from the search results.

In some embodiments, a computer-implemented method may include generating, on a graphical user interface (GUI), an interactive element configured to receive text input and a list of research categories, receiving, via the interactive element of the GUI, a research target and, via the list of the GUI, a research category, retrieving, from a search engine and based on the research category, a set of documents related to the research target, generating a prompt for a generative artificial intelligence (AI) model based on the retrieved set of documents and the research category, and presenting, on the GUI, a research summary returned by the generative AI model in response to the generated prompt.

In some of these embodiments, the method may further include determining, via a predictive AI model, at least one relevant document from the set of documents, wherein the generating the prompt is further based on the at least one relevant document.

In some of these embodiments, the determining of the at least one relevant document may include generating a set of document embeddings representative of the set of documents, generating a research embeddings based on the research target and the research category, and determining the at least one relevant document as one or more of the set of documents having corresponding document embeddings within a threshold distance of the research embeddings.

In some of these embodiments, the generating the set of document embeddings may include processing the set of documents to derive a set of document chunks, removing noise from the set of document chunks, and generating a chunk embeddings for each document chunk, wherein the set of document embeddings may include a set of chunk embeddings.

In some of these embodiments, the method may further include storing the generated set of document embeddings in a vectorstore for training the predictive AI model.

In some of these embodiments, generating the prompt may include retrieving, from a database, a pre-generated prompt based on the research category, and supplementing the pre-generated prompt with the retrieved set of documents.

In some of these embodiments, the method may further include vectorizing the set of documents prior to the generating the prompt for the generative AI model.

In some of these embodiments, the retrieving the set of documents from the search engine may include retrieving, from a database, a pre-generated search phrase based on the research category, supplementing the pre-generated search phrase with the research target, and transmitting the supplemented search phrase to the search engine.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A system comprising:
a processor; and
a non-transitory computer readable medium stored thereon instructions that are executable by the processor to cause the system to perform operations comprising:
receiving, through a graphical user interface (GUI), a user input to generate a first prompt for performing a query based on a search criteria, the search criteria comprising a target of the query and a type of the query, the generated first prompt comprising one or more search terms based on the target of the query;
autonomously retrieving, by a first machine learning model, a set of search results responsive to the first prompt;
autonomously generating, by a second machine learning model and based on the type of the query, a second prompt configured to trigger, in response to receipt by a generative artificial intelligence (AI) program, a summary of the set of search results responsive to the query;
transmitting the second prompt and the set of search results to the generative AI program; and
presenting, on the GUI, the summary responsive to the query.

2. The system of claim 1, wherein receiving the user input defining the query comprises:
presenting, on the GUI, a list of possible query types;
presenting, on the GUI, an interactive element configured to enable text input;
receiving, via the GUI, an interaction with at least one of the list or the interactive element; and
determining an indication of the query based on the received interactions.

3. The system of claim 1, wherein determining the set of search results comprises:
retrieving, from a search engine, a plurality of search results;
dividing each search result into a corresponding set of text chunks;
generating, via the first machine learning model, a set of embeddings vectors representative of the set of text chunks;
generating, via the first machine learning model, a query embeddings vector representative of the target of the query; and
determining the set of search results as one or more text chunks corresponding to one or more embeddings vectors within a threshold distance of the query embeddings vector.

4. The system of claim 3, wherein the retrieving the plurality of search results from the search engine comprises:
retrieving, from a database, a pre-generated search phrase based on the type of the query;
supplementing the pre-generated search phrase with the target of the query; and
transmitting the supplemented search phrase to the search engine.

5. The system of claim 3, wherein the generated set of embeddings vectors are stored in a vectorstore.

6. The system of claim 1, wherein the generating the prompt comprises:
retrieving, from a database, at least one pre-determined phrase; and
supplementing the at least one pre-determined phrase with information derived from the query.

7. The system of claim 1, wherein the set of search results is vectorized prior to transmission to the generative AI program.

8. A method comprising:
presenting, on a graphical user interface (GUI), an interactive element;
receiving, via the interactive element on the GUI, a user input defining a research target and a type of research to generate a first prompt comprising one or more search terms based on the research target;
autonomously retrieving, from a search engine, search results related to the research target based on the first prompt;
identifying, using a predictive machine learning model, at least one relevant portion of the search results, the at least one relevant portion comprising information related to the research target and responsive to the type of research;
autonomously generating a second prompt based on the type of research and the at least one relevant portion of the search results; and
receiving, from a generative machine learning model in response to receipt of the generated second prompt, a report indicative of the research target.

9. The method of claim 8, wherein the identifying the at least one relevant portion of the search results comprises:
dividing the retrieved search results into a plurality of text portions;
processing the plurality of text portions to remove noise;
generating, for the plurality of text portions, a plurality of embeddings vectors, each embeddings vector representative of a text portion;
generating a reference embeddings vector based on the research target; and determining one or more of the plurality of text portions as the at least one relevant portion based on a distance between corresponding embeddings vectors and the reference embeddings vector.

10. The method of claim 9, wherein the identifying further comprises storing the plurality of embeddings vectors in a vectorstore for training the predictive machine learning model.

11. The method of claim 8, wherein the interactive element comprises a list of possible research types and a field configured to enable text input.

12. The method of claim 8, wherein generating the prompt comprises:

retrieving a pre-determined prompt based on the type of research; and supplementing the pre-determined prompt with the at least one relevant portion from the search results.

13. A computer-implemented method comprising:

generating, on a graphical user interface (GUI), an interactive element configured to receive text input and a list of research categories;

receiving, via the interactive element of the GUI, a research target and, via the list of the GUI, a research category;

autonomously generating a first prompt based on retrieving one or more search terms associated with the research target;

retrieving, from a search engine and based on the research category, a set of documents related to the research target in response to the first prompt;

generating a second prompt for a generative artificial intelligence (AI) model based on relevant documents of the retrieved set of documents and the research category; and presenting, on the GUI, a research summary returned by the generative AI model in response to the generated second prompt.

14. The method of claim 13, further comprising determining, via a predictive AI model, at least one relevant document from the set of documents, wherein the generating the prompt is further based on the at least one relevant document.

15. The method of claim 14, wherein the determining the at least one relevant document comprises:

generating a set of document embeddings representative of the set of documents;

generating a research embeddings based on the research target and the research category; and determining the at least one relevant document as one or more of the set of documents having corresponding document embeddings within a threshold distance of the research embeddings.

16. The method of claim 15, wherein the generating the set of document embeddings comprises:

processing the set of documents to derive a set of document chunks;

removing noise from the set of document chunks; and generating a chunk embeddings for each document chunk, wherein the set of document embeddings comprises a set of chunk embeddings.

17. The method of claim 15, further comprising storing the generated set of document embeddings in a vectorstore for training the predictive AI model.

18. The method of claim 13, wherein generating the prompt comprises:

retrieving, from a database, a pre-generated prompt based on the research category; and supplementing the pre-generated prompt with the retrieved set of documents.

19. The method of claim 18, further comprising vectorizing the set of documents prior to the generating the prompt for the generative AI model.

20. The method of claim 13, wherein the retrieving the set of documents from the search engine comprises:

retrieving, from a database, a pre-generated search phrase based on the research category;

supplementing the pre-generated search phrase with the research target; and transmitting the supplemented search phrase to the search engine.

*     *     *     *     *